(12) United States Patent
Shrivastava et al.

(10) Patent No.: US 10,996,060 B2
(45) Date of Patent: May 4, 2021

(54) CAMERA-BASED POSITIONING SYSTEM USING LEARNING

(71) Applicants: William Marsh Rice University, Houston, TX (US); Seoul National University R&DB Foundation, Seoul (KR)

(72) Inventors: Anshumali Shrivastava, Houston, TX (US); Chen Luo, Houston, TX (US); Krishna Palem, Houston, TX (US); Yongshik Moon, Seoul (KR); Soonhyun Noh, Seoul (KR); Daedong Park, Seoul (KR); Seongsoo Hong, Seoul (KR)

(73) Assignees: William Marsh Rice University, Houston, TX (US); Seoul National University R&DB Foundation, Seoul (KR)

(*) Notice: Subject to any disclaimer, the term of this patent is extended or adjusted under 35 U.S.C. 154(b) by 180 days.

(21) Appl. No.: 16/327,900

(22) PCT Filed: Aug. 28, 2017

(86) PCT No.: PCT/US2017/048839
§ 371 (c)(1),
(2) Date: Feb. 25, 2019

(87) PCT Pub. No.: WO2018/093438
PCT Pub. Date: May 24, 2018

(65) Prior Publication Data
US 2019/0195634 A1    Jun. 27, 2019
US 2020/0256679 A2    Aug. 13, 2020

Related U.S. Application Data

(60) Provisional application No. 62/380,249, filed on Aug. 26, 2016.

(51) Int. Cl.
*G01C 21/20*       (2006.01)
*G06F 16/51*       (2019.01)
(Continued)

(52) U.S. Cl.
CPC .......... *G01C 21/206* (2013.01); *G06F 16/51* (2019.01); *G06F 16/532* (2019.01);
(Continued)

(58) Field of Classification Search
CPC ............... G01C 21/206; G06T 7/74; G06T 2207/20081; G06F 16/51; G06F 16/532;
(Continued)

(56) References Cited

U.S. PATENT DOCUMENTS

2009/0285492 A1    11/2009   Ramanujapuram et al.
2013/0194428 A1     8/2013   Chao et al.
(Continued)

OTHER PUBLICATIONS

Card, "Qualitative Image Based Localization in a Large Building", 2010, Colorado School of Mines (Year: 2015).*
(Continued)

*Primary Examiner* — Peter D Nolan
*Assistant Examiner* — Ashley L Redhead, Jr.
(74) *Attorney, Agent, or Firm* — Kowert, Hood, Munyon, Rankin & Goetzel, P.C.

(57) ABSTRACT

A device, system, and methods are described to perform machine-learning camera-based indoor mobile positioning. The indoor mobile positioning may utilize inexact computing, wherein a small decrease in accuracy is used to obtain significant computational efficiency. Hence, the positioning may be performed using a smaller memory overhead at a faster rate and with lower energy cost than previous implementations. The positioning may not involve any communication (or data transfer) with any other device or the cloud, providing privacy and security to the device. A hashing-
(Continued)

based image matching algorithm may be used which is cheaper, both in energy and computation cost, over existing state-of-the-art matching techniques. This significant reduction allows end-to-end computation to be performed locally on the mobile device. The ability to run the complete algorithm on the mobile device may eliminate the need for the cloud, resulting in a privacy-preserving localization algorithm by design since network communication with other devices may not be required.

20 Claims, 5 Drawing Sheets

(51) Int. Cl.
G06N 20/00 (2019.01)
G06F 16/532 (2019.01)
G06T 7/73 (2017.01)
G06K 9/62 (2006.01)

(52) U.S. Cl.
CPC ......... *G06K 9/6215* (2013.01); *G06K 9/6256* (2013.01); *G06N 20/00* (2019.01); *G06T 7/74* (2017.01); *G06T 2207/20081* (2013.01); *Y02D 30/70* (2020.08)

(58) Field of Classification Search
CPC .... G06N 20/00; G06K 9/6215; G06K 9/6256; Y02D 30/70
See application file for complete search history.

(56) References Cited

U.S. PATENT DOCUMENTS

| 2013/0279806 | A1 | 10/2013 | Tonisson et al. |
| 2014/0056520 | A1* | 2/2014 | Rodriguez Serrano ..................... G06K 9/325 382/174 |
| 2015/0227557 | A1 | 8/2015 | Holzschneider et al. |
| 2017/0053408 | A1* | 2/2017 | Manweiler .......... G06F 16/5866 |
| 2020/0192388 | A1* | 6/2020 | Zhang .................. G05D 1/0253 |

OTHER PUBLICATIONS

Kawaji et al., "An Image-Based Indoor Positioning for Digital Museum Applications", 2010, IEEE (Year: 2010).*
International Search Report for International Patent Application No. PCT/US2017/48839 dated May 1, 2018.
Written Opinion for International Patent Application No. PCT/US2017/48839 dated May 1, 2018.

* cited by examiner

CAMERA-BASED POSITIONING SYSTEM USING LEARNING

GOVERNMENT RIGHTS IN INVENTION

This invention was made with government support under Grant No. FA8750-16-2-0004 awarded by the Department of Defense—Air Force Research Laboratory (DoD-AFRL). The government has certain rights in the invention.

FIELD OF THE INVENTION

The present invention relates to the field of wireless devices, and more particularly to camera-based positioning systems for wireless devices.

DESCRIPTION OF THE RELATED ART

As mobile electronic devices become increasingly interwoven in a user's life, there have arisen a multitude of situations in which it may be desirable to locate the position of the device. Localization technology to accomplish this task is an active area of research. Many existing implementations rely on communication using satellite-based positioning technology (e.g., GPS or other technology). However, in some indoor situations communication with a remote satellite may prove difficult. Camera-based localization typically requires substantial time and computational resources to perform effectively, and may further require that the computation be performed remotely (e.g., in the cloud). Improvements in the field of indoor camera-based localization are therefore desirable.

SUMMARY

A device, system, and methods are described to perform machine-learning camera-based indoor mobile positioning. The indoor mobile positioning may utilize inexact computing, wherein a small decrease in accuracy is used to obtain significant computational efficiency. Hence, the positioning may be performed using a smaller memory overhead at a faster rate and with lower energy cost than previous implementations. The positioning may not involve any communication (or data transfer) with any other device or the cloud, providing privacy and security to the device. A hashing-based image matching algorithm may be used which is cheaper, both in energy and computation cost, over existing state-of-the-art matching techniques. This significant reduction allows end-to-end computation to be performed locally on the mobile device. The ability to run the complete algorithm on the mobile device may eliminate the need for the cloud, resulting in a privacy-preserving localization algorithm by design since network communication with other devices may not be required.

Figure 1:
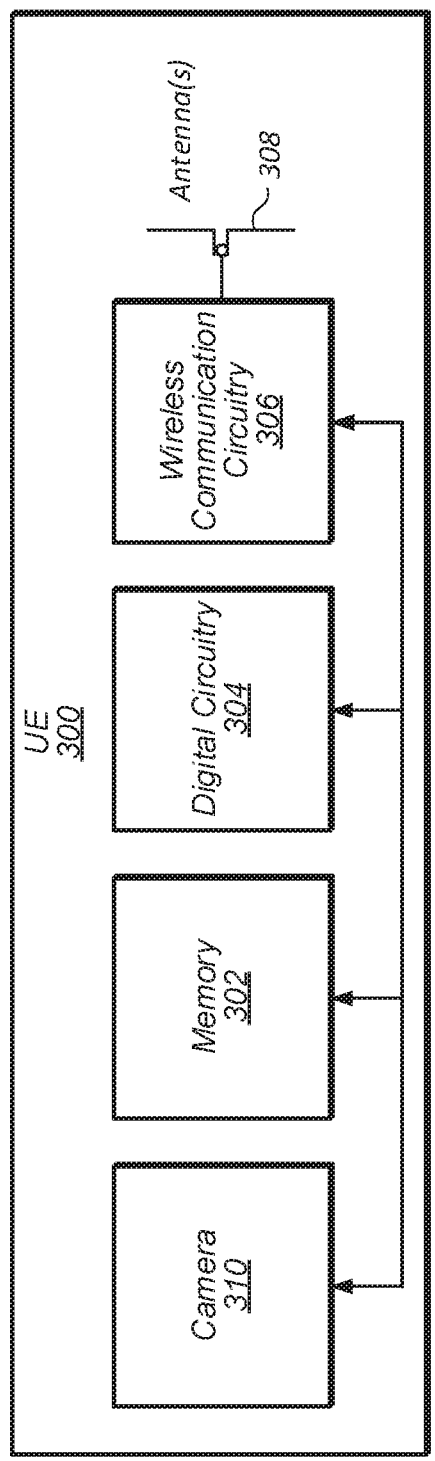
FIG. 1 is a schematic diagram of a user equipment device (UE), according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

INCORPORATED BY REFERENCE

The following patent applications and published papers are incorporated by reference and provide teachings regarding inexact computation, probabilistic algorithms, multidimensional feature extraction, locality sensitive hashing, and computer vision algorithms:

(1) Palem K. V. (2003) "Computational Proof as Experiment: Probabilistic Algorithms from a Thermodynamic Perspective". In: Dershowitz N. (eds) Verification: Theory and Practice. Lecture Notes in Computer Science, vol 2772. Springer, Berlin, Heidelberg.

(2) Palem K. V. (2005) "Energy aware computing through probabilistic switching: a study of limits". IEEE Transactions on Computers, Volume 54, Issue 9, pages 1123-1137, September 2005.

(3) Palem K. V. (2014) "Inexactness and a future of computing". Phil. Trans. R. Soc. A 372:20130281.

(4) U.S. Pat. No. 8,589,742 B2, titled "Computing device using inexact computing architecture processor", published Nov. 19, 2013.

(5) H. Bay, T. Tuytelaars, and L. Van Gool, "Surf: Speeded up robust features," in European conference on computer vision. Springer, 2006, pp. 404-417.

(6) P. Indyk and R. Motwani, "Approximate nearest neighbors: Towards removing the curse of dimensionality," in STOC, Dallas, Tex., 1998, pp. 604-613.

(7) D. Achlioptas, "Database-friendly random projections," in PODS, Santa Barbara, Calif., 2001, pp. 274-281.

(8) A. Vedaldi and B. Fulkerson, "VLFeat: An open and portable library of computer vision algorithms," http://www.vlfeat.org, 2008.

TERMINOLOGY

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), computer-based television systems, grid computing systems, wearable computers, wearable devices, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

As used herein, a processing element refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

DETAILED DESCRIPTION

Embodiments herein describe a camera based (privacy-preserving) indoor mobile positioning system, Camera-based Positioning System using Learning (CaPSuLe), which may not involve any communication (or data transfer) with any other device or the cloud. According to some embodiments, to determine position of a device in an indoor environment accurately, instead of using GPS, Wi-Fi or any cloud based service, a user of a UE may take a picture and algorithmically determine the location of the UE, using computationally cheap on-device hash lookups of the taken image. The indoor mobile positioning may utilize inexact computing, wherein a small decrease in accuracy is used to obtain significant computational efficiency.

Embodiments herein may provide sustainable and private navigation, e.g., in mall, campuses, indoor building etc., without involving any network or cloud service. The navigation may be privacy preserving (the position of the user is never calculated outside the device) and may be free from any remote data transfer. In some embodiments, the positioning system can be easily changed into a navigating system by storing a map.

Embodiments of the present invention may be used, e.g., in connection with: any mall, campus, complex of buildings, etc. interested providing navigation or direction services; and/or any map-service-providing company interested in energy efficient computing such as Google™ Apple™, Bing™, etc.; and/or venue based marketing.

FIG. 1—Example Block Diagram of a User Equipment Device

FIG. 1 illustrates an example block diagram of a user equipment device (UE) 300 which may be configured for use in conjunction with various aspects of the present disclosure, according to some embodiments. The UE 300 may be any of a variety of types of devices and may be configured to perform any of a variety of types of functionality. For example, the UE 300 may be any of user equipment devices (UEs), mobile telephones or smart phones (e.g., iPhone™, Android™-based phones), portable gaming devices (e.g., Nintendo DS™, PlayStation Portable™, Gameboy Advance™), laptops, tablets, wearable devices (e.g., smart watch, smart glasses), PDAs, portable Internet devices, music, video, or other media players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

As shown, the device 300 may include digital circuitry 304. The digital circuitry 304 may be any a processor or processors, one or more processing elements, application-specific integrated circuits (ASICs), or programmable hardware element(s) such as field-programmable gate arrays. The digital circuitry 304 may include or be coupled to one or more local and/or system memory elements, such as memory 302. Memory 302 may include any of a variety of types of memory media and may serve any of a variety of functions. For example, memory 302 could be RAM serving as a system memory for processing element 304. Other types of memory and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may providing processing capability for the wireless communication circuitry 306. The device 300 may be capable of communicating using any of various wireless communication technologies by way of wireless communication circuitry 306 and antenna(s) 308.

The device 300 may additionally include a camera 310. The camera may be any of a variety of types of image-recording devices that is configured to record an image. The camera 310 may be configured to operate in the visible part of the electromagnetic spectrum, or in some embodiments the camera may record images in other portions of the electromagnetic spectrum (for example, an infrared (IR) camera and/or an ultraviolet (UV) camera). The camera 310 may be configured to output recorded images to the memory 302 and/or the digital circuitry 304.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as digital circuitry 304, memory 302, wireless communication circuitry 306, camera 310 (e.g., when implemented in hardware), and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between digital circuitry 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between digital circuitry 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing features for performing machine learning camera-based indoor localization as described herein.

Motivation

Indoor localization technology is a large and growing area of technology. Increased demand for accurate indoor localization market may be due to venue-based marketing, poor performance of GPS in indoor environments, and government initiatives in developing positioning systems for public safety and urban security segments.

GPS signals may be blocked indoors and therefore have poor accuracy. Therefore, existing implementations may use a variety of algorithms utilizing other sensors (for example, WiFi or other technologies), for estimating the location of a device while indoors. Such algorithms may rely on aggregating information from multiple sensors to get good accuracy, which may make the location estimate computationally expensive and complicated.

Embodiments herein describe methods and associated systems for locating a mobile device more accurately by utilizing the device's camera. In some embodiments, a current image taken by the camera may be compared with a database of geo-tagged images. Recent advances in image processing have made image matching technology quite accurate, which makes camera based image positioning a promising direction for performing indoor localization. However, many current image matching algorithms are quite expensive from both a latency and an energy perspective, and therefore they may be unable run locally on a mobile device. For instance, as shown in detail below, current state-of-the-art image matching algorithms when run on a database of 719 images may require more than 1000 seconds and may use around 2100 Joules of energy to acquire the current location of a device. These results are very impractical for use in a mobile context.

Other existing implementations consider a cloud-based service to perform image matching. However, there are three major concerns with cloud-based image matching: communication, energy consumption, and privacy.

Communication—In cloud-based image matching, the current image must be transmitted from the mobile device to the cloud, followed by the location, inferred in the cloud, and transferred back to the mobile device. Communication often has unpredictable latency, as it may require utilization of a wireless communication network (e.g., WiFi, cellular networks, etc.).

Energy consumption—Image matching is a computationally expensive operation. A cloud-based image-matching service, even if very fast, is likely to consume a significant amount of energy, which may be undesirable.

Privacy—Transfer of data back and forth to the cloud compromises the privacy of user's information. For example, data transfer may open the possibility of potential privacy breaches.

In contrast to the implementations described above, embodiments described herein attempt to trade a small amount of quality for improved energy efficiency. In some embodiments, variables of the described methods may be adjusted (e.g., L and/or K, as described below) to obtain a desirable balance between accuracy and energy efficiency. As described in further detail below, trading a small amount of accuracy may effectively remove all the three of the shortcomings (described above) associated with the cloud-based image matching techniques.

Embodiments are described herein for Camera-Based Positioning System Using Learning (CaPSuLe), which is a method (and associated devices and systems) for image-based device positioning, using an approximate image matching algorithm based on fast locality sensitive hashing. In trial implementations, CaPSuLe is shown below to be more than 500× times cheaper than state-of-the-art image matching algorithms. In some embodiments, the significant gain in computation and energy cost is a result of careful choices of hash tables, hash functions, and related operations. This massive reduction enables the performance of end-to-end image matching on the mobile device itself. An exemplary algorithm takes 1.92 seconds requiring 3.78 Joules energy on Samsung Galaxy S4™ archiving 92.11% accuracy in estimating the location. Since all computations are local and are performed on the device, the CaPSuLe algorithm is free from privacy infringements as no information is transmitted remotely. Embodiments herein may advantageously lead to many new energy efficient machine learning algorithms where the need for cloud computing can be removed.

Devise Positioning Via Image Matching

Embodiments described herein for an image-based positioning system may take the current picture of the location and match it with images in a pre-collected database of geo-tagged images of areas within a building such as a shopping mall. The location of the matched image may be deemed to be the current position of the device. An important observation is that building a densely sampled dataset comprising images, tagged with their geo-location at different places in the indoor environment is a relatively easy task with the surge in the number of images. The accuracy of the system may then be directly dependent on the ability to identify the right matching image in the database, which is a classical computer vision problem.

In some embodiments, a collection of geo-tagged images C consisting of images from the given indoor environment may be obtained, e.g., shopping mall, campus, etc., where the device needs to be positioned. By using its camera, the device may create a query image q. The goal of the image matching algorithm may be to find an image $I \in C$ which maximizes the "similarity" with the query q. Formally, $$I = \arg\min \operatorname{Sim}(q, I), I \in C \quad (1)$$

An important vision component in Equation 1 is the design of the similarity function or Sim (.,.), which captures the notion of semantic similarity between different images. Sim (.,.) must tolerate variations in pose, resolutions, shifts, etc. For better demonstration of the challenges associated with the state of the art, we first describe an exemplary setting and dataset.

Dataset and Settings

The CaPSuLe method was tested using a main branch of a major shopping mall in Seoul, Korea for the positioning system. In total, 871 were collected images of different shops in the mall. Images were collected by using Naver Indoor Maps™. Additionally, to get a good coverage of the mall, pictures of stores were taken manually by a cellphone camera. Overall, 45 different locations in the shopping mall were covered. The images were taken with varying poses and lighting to ensure that the datasets reflect the real settings. Also, two separate sources of images make the setting more real and free of common bias.

Figure 2:
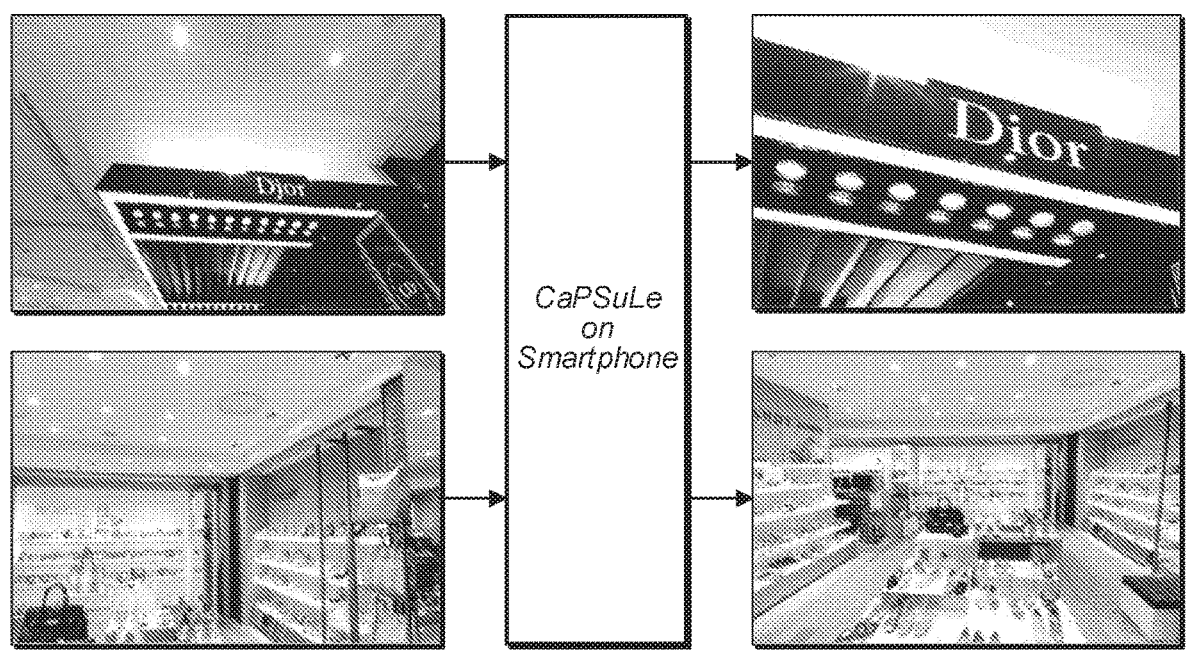
FIG. 2 is an illustration of an example query image and a corresponding training image which were both taken at a similar location, according to some embodiments.

Each image was annotated with its corresponding locations. Each image was further downscaled to 640×360 pixels to reduce the computational cost associated with matching without significant loss of accuracy. For evaluation, the data was partitioned into two sets: 719 training images and 152 query images. FIG. 2 illustrates some query images and the matched training images for these query images using the CaPSuLe system. The complexity of the problem is apparent as the matching images can have varying poses, orientations, different coloration and/or lighting, and different perspectival distortions.

Device and Platform

TABLE 1

| Target System Description | | |
|---|---|---|
| Hardware | System on Chip | Exynos 5410 Octa |
| | CPU | Quad-core 1.6 GHz Cortex-A15 |
| | Main Memory | 2 GB |
| | Storage | 16 GB NANO Flash |
| Software | OS Kernel | Linux kernel version 3.4.5 |
| | Android Framework | Android 5.0.1 |
| | OpenCV | OpenCV 3.1 for Android |

A Samsung Galaxy S4™ smartphone with Android 5.0.1 Lollipop™ running with a Linux kernel 3.4.5 was used. The smartphone has an ARM processor that consists of four Cortex-A15 cores and 2 GB DRAM. We additionally used a Monsoon Power Meter to measure the power consumption of the smartphone. The detailed hardware and software configuration of the target system is shown in Table I.

The Image Matching Problem and its Computational (Energy) Barrier

With advancements in vision technology, image matching has become quite accurate. However, image matching techniques are far from being computationally cheap. Modem matching algorithms may require a costly similarity measure Sim (.,.), for good accuracy. Such expensive computations cannot be performed on the device because of their significant computational requirements. To compare with CaPSuLe, we use a state-of-the-art algorithm as a baseline, as implemented in the widely used OpenCV™ package, for computing Equation 1. The similarity measure, Sim (.,.), used in the OpenCV package leads to 93% accuracy on our dataset. Other similarity measures based on Euclidian distance over Bag-of-Words (BoW) only yields 75% or less accuracy because our dataset contains many variations seen in the real environment which is not adequately captured by BoW methods.

OpenCV implementation for determining the similarity between the query q and any given image $I \in C$ employs the following three steps:

1. Extract Features from Images: The first step is to extract a set of Speeded Up Robust Features (SURF features) (for more detail on SURF, see reference (5) above, which is incorporated by reference) from both the query image and I. In this example, each of these features is a 64-dimensional vector, and 512 SURF features are used. We thus get 512 different 64-dimensional SURF features from each image. SURF features are the best-known features invariant to scale and other spurious transformations such as rotations. Scale-invariant Feature Transform (SIFT) features may also be used, although SURF features typically have superior performance. Note, for every image I in the given training collection C, feature extraction is done off-line. For the query, however, feature extraction may need to be done on the fly (i.e., during localization).

2. Threshold all pairwise features: The Euclidian distance between all possible feature combinations between q and I may be computed. This requires 512×512 Euclidian distance computations between 64 dimensional vectors from q and I, totaling 512×512×64 multiplications.

3. Compute the Similarity Values: The final score is the number of distances out of the 512×512 comparisons which are smaller than a threshold. Roughly, this similarity measure scores based on the number of cross matches from the 512 different SURF features between the query and the image I.

The computational bottleneck in this process is step number 2 which requires 512×512×64>16 million multiplications for computing the similarity between the query and one image I ∈ C. Thus, for 719 images in our datasets, a single query requires (512×512×64×719), more than 12 billion multiplications. If we plan to run this amount of computation on the mobile device, then to reiterate a single query would take more than 1030 seconds consuming more than 2100 Joules of energy. Step 2 is the primary reason why current image-based positioning algorithm needs the cloud to perform matching in reasonable time. However, as argued before, the cloud-based solution has many shortcomings. This method described above using OpenCV will be referred to herein as the Bruteforce Method.

Clustering (Bag-of-Words (BoW), Sparse Coding, Etc.)

Another popular feature representation which does not require 512×512 distance calculation is the BoW (or sparse coding) feature representation. BoW tries to eliminate the need for multiple comparisons by pre-clustering all the extracted 512 SURF features. However, employing clustering techniques does not alleviate the deficiencies of the Bruteforce Method. After clustering, BoW calculates the distances between all feature vectors of the current image and the cluster centers. BoW then produces a histogram expressing the closeness between cluster centers and the training image's SURF feature vectors. Image matching is finally performed by comparing the query image's histogram and the stored training image's histograms. This process is computationally relatively cheap. However, it comes with a significant loss in accuracy. With the example dataset described above, this approach barely reached 75% accuracy even with as many as 1000 clusters. Changing the cluster size to 5000 had no additional effect on accuracy.

Image matching is often a harder task than object detection. For instance, two images may have the same categorical object (such as a chair), but they may not match with each other. This is probably the main reason why BoW is more common for object detection rather than image matching, as the popular state-of-the-art package OpenCV implements the more costly matching algorithms described above.

Probabilistic Hashing Algorithms

In some embodiments, the need for accuracy is relaxed by a small amount to alleviate the shortcomings of existing implementations. In particular, Locality Sensitive Hashing (LSH) algorithms may be used, combined with a careful choice of hash functions and estimation procedure to get a more than 500× reduction in the computational and the energy cost.

Locality Sensitive Hashing (described in greater detail in reference (6) above, which is incorporated by reference) is popular for efficient sub-linear time matching. In some embodiments, LSH generates a random hash map h which takes the input (usually the data vector) and outputs a discrete (random) number. For two data vectors x and y, the event $h(x)=h(y)$ is called the collision (or agreement) of hash values between x and y. The hash map has the property that similar data vectors, in some desired notion, have a higher probability of collisions than non-similar data vectors. Informally, if x and y are similar, then $h(x)=h(y)$ is a more likely event, while if they are not similar, then $h(x) \neq h(y)$ is more likely. In some embodiments, the output of the hash functions is a noisy random fingerprint of the data vector, which being discrete is used for indexing training data vectors into hash tables. These hash tables represent an efficient data structure for matching and learning.

In some embodiments, in Step 2 of image matching ("Threshold all pairwise features", described above), for every SURF feature of the query image q, a matching SURF feature is searched for from the image I. This matching can be made efficient using hashing. However, only performing fast near neighbor search with hashing does not yield the desired benefit. As described below, many careful choices may improve performance.

Figure 3:
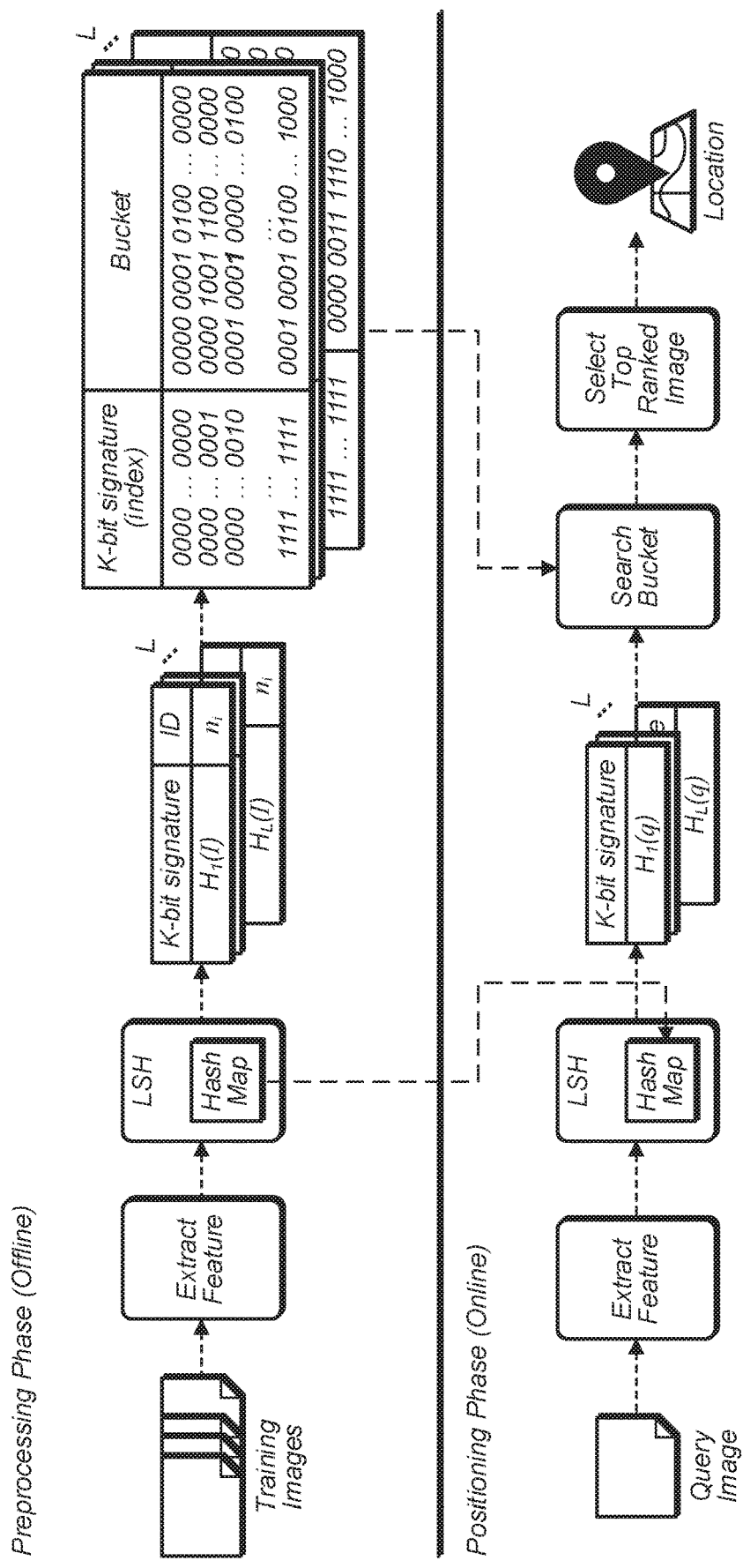
FIG. 3 is a schematic flow diagram of the Camera-Based Positioning System Using Learning (CaPSuLe) method, according to some embodiments.

FIG. 3: The CaPSuLe System: Near-Cloud Performance with On-Device Computation.

FIG. 3 is a flowchart diagram that summarizes the CaPSuLe system. The system contains a set of lightweight hash tables which, for a given SURF feature of a query image, finds all the potential matching SURF features from the training set. This search is done in near-constant time, by querying hash tables indexed by LSH, which saves a significant amount of computational (and hence energy) overhead without compromising the accuracy.

In some embodiments, CaPSuLe uses two parameters K and L which trade accuracy for gains, notably in energy and in computational time. The algorithm works in two main phases for device positioning, as described below Preprocessing Phase (Offline): In the offline phase, analogously to Step 1 "Extract Features from Images" described above, 512 SURF features (64 dimensional) are extracted from each geo-tagged image I in the training collection C. Then, L different hash tables may be created of size $2^K$, i.e., K-bit keys (or indices). Each of the 512 SURF features of I may be mapped to a K-bit signature $H_j(I)$, using some LSH scheme $H_j$, for j ∈ {1, 2, . . . , L}. The image I may then be placed into hash table number j indexed by the K-bit signature $H_j(I)$ (as the key). Thus, every image may be mapped to 512 keys (the mappings may be duplicate) in each of the L hash tables. The preprocessing step thus generates L independent hash tables.

Query Phase (Online): Given a query image q, 512 SURF features may again be extracted (64 dimensional each). For each of these 512 SURF features, the bucket may be retrieved that is associated with the $H_j(q)$ in hash table j. Overall, 512×L keys may be obtained and the corresponding buckets (values) in the associated hash tables may be inspected. Every image may then be ranked based on the number of times it is observed in the 512×L buckets. The location of the top ranked image may be returned as the current location, as the final output.

In this some embodiments, various design choices may be made to improve the functionality of the CaPSuLe. For example:

Reduce Hashing Cost: The cost of computing L different K-bit hashes may be expensive with popular LSH schemes (for example, signed random projections). In particular, traditional LSH may require K×L×512×64 multiplications for computations of all the hashes (also the keys), which is very expensive computationally. In some embodiments, a cheap and sparse variant may be used (for example, as described in detail in reference 7 above, which is incorporated by reference), which reduces the total hashing cost per query to ⅓ (K×L×512×64) additions/subtractions. This is a significant reduction also since multiplications are costlier than additions.

Buckets of Bit Arrays: The hash tables store multiple images for every key. Even if only integer image IDs are stored, the memory cost is significant. In the example case of 719 training images, in some embodiments a 719-bit array may be stored that is indexed by the K-bit key ($2^K$ values). If the image numbered n, gets a particular key, the bit numbered n, in the bit-array associated with the key may be set to a particular value (e.g., '1', as shown in FIG. 3). This may lead to around a 32× reduction in the hash table size compared to the traditional scheme. Furthermore, any memory associated with empty buckets may be removed during preprocessing to avoid unnecessary memory usage.

Cheap and Crude Ranking Estimation based on Bucket Matches: Hashing may report many images (sometimes multiples of a 100) as potential matches. For computing the best match, the recommended option in the literature is to rank candidates using the similarity function Sim. However, as argued above, computing Sim is computationally expensive. In some embodiments, properties of LSH are utilized to cheaply estimate the ranking by counting the number of times an image is hit by the query. Estimation using LSH signatures are significantly cheaper than similarity computation.

Ignoring Noisy Buckets: As the hash functions are computationally cheap, there is a significant possibility that individual key values may be due to bias in the LSH functions. Such bias may make some of the buckets unnecessarily crowded. Crowded buckets increase the computational time and energy since the algorithm retrieves unnecessary candidates. In some embodiments, to eliminate this issue, buckets are ignored (treated it as empty) if they are overcrowded. In other words, if a bucket has a number of features that exceeds a predetermined threshold, the bucket may be determined to be overcrowded and may be treated as empty. In some embodiments, the predetermined threshold may be a fraction of the total number of features in the training images.

Reducing Main Memory: Although hash tables are significantly small (few hundred MBs), for mobile devices, loading all of them in main memory still requires time and computational resources. In some embodiments, the hash tables are organized into contiguous buckets, i.e., $2^K$ indices each of 719 bits (see FIG. 3). The hash tables may be stored in device memory and the L buckets (719 bits for each bucket) may be loaded on demand during runtime (for example, using the fseek function) without noticeable power overhead. These embodiments may advantageously allow CaPSuLe to operate with low main memory requirements.

Dynamic Updates

In some embodiments, an advantageous characteristic of CaPSuLe is that it can be incrementally updated. In particular, adding/deleting images to/from the database may only amounts to flipping a few bits, to add the new image (with labels) in the corresponding buckets, into the appropriate hash table. Thus, increasing the number of images or locations can be handled with no modification to the algorithm and minimal change to the data structure. In these embodiments, the training data may be updated as desired without having to reinstall the entire training data set.

Figure 4:
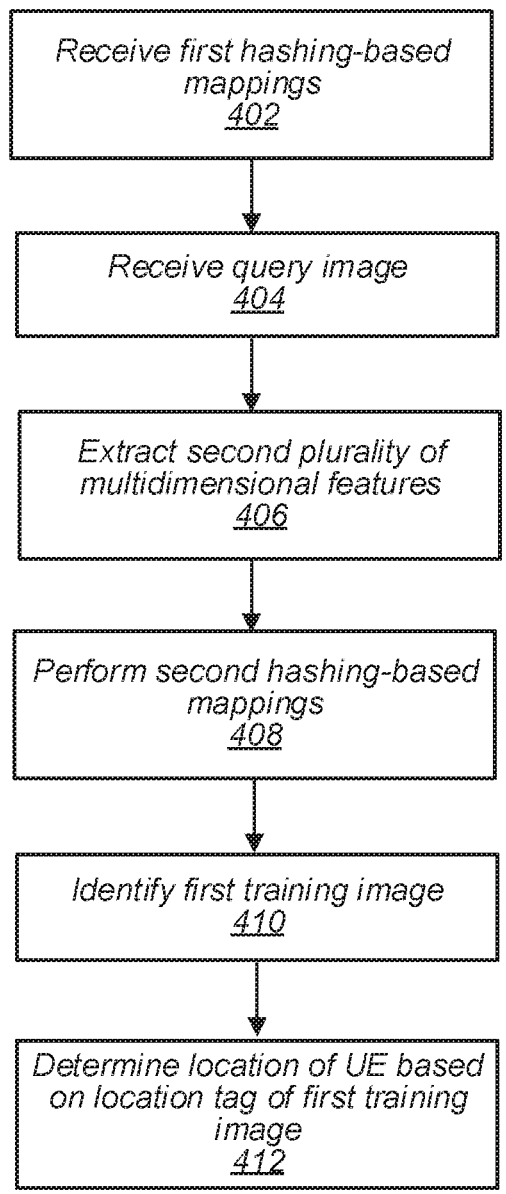
FIG. 4 is a flow-chart of a method for performing camera-based localization, according to some embodiments.

FIG. 4—Mobile Positioning Flowchart

FIG. 4 is a flow chart diagram illustrating a method for performing machine-learning camera-based indoor mobile positioning, according to some embodiments. The method may be performed by any of a variety of devices such as UE 300.

At 402, a plurality of first hashing-based mappings may be received from a first plurality of multidimensional features of respective training images to entries in a key index. The UE may store the first hashing-based mappings into memory. The UE may keep the first hashing-based mappings stored in memory, and may load them into the digital circuitry of the UE during runtime (e.g., it may load them when a localization procedure is initiated). Each of a plurality of training images may have associated with it a plurality of multidimensional features. The multidimensional features may be SURF features, or they may be another type of multidimensional features used for image characterization. As described in greater detail above, the hashing-based mapping may map each of the multidimensional features of each of the training images to an entry in a key index. As described in greater detail above, the entries in the key index may be a K-bit signature using a Locality Sensitive Hashing (LSH) algorithm. In some embodiments, K may be adjusted in order to balance between accuracy and computational cost (e.g., computational load, energy cost, time requirements, memory requirements, or other computational costs). For example, a larger value of K will allow for a larger number of distinct key index entries, but will also require additional computing time and memory. In some embodiments, the LSH employs sparsity to reduce the computational hashing cost per training image and per query image.

In some embodiments, the UE may receive the completed first hashing-based mappings from a remote device (e.g., it may receive the mappings using its wireless circuitry and antenna). In other embodiments, the UE itself may extract a respective first plurality of multidimensional features from each respective training image, and perform the first hashing-based mapping from the first plurality of multidimensional features of each respective training image to entries in the key index.

In some embodiments, the plurality of training images may contain n training images. In some embodiments, storing the hashing-based mappings in the memory medium may be accomplished by storing an n-bit array indexed by the entries of the key index. For example, for each entry of the key index, each of the n bits may be set to 0 or 1 depending on whether a feature of the $n^{th}$ training image was hashed to the entry.

In some embodiments, the UE may perform the first hashing-based mapping from the first plurality of multidimensional features of each respective training image to entries in the key index a plurality of times for a plurality of independent key indices. The LSH algorithm may utilize random (or pseudorandom) numbers to map each feature to an entry in the key index. To improve the accuracy of the localization method, it may be advantageous to perform the LSH algorithm a plurality of times for a plurality of independent key indices (e.g., to average out statistical fluctuations and poorly mapped features). In some embodiments, the number of independent key indices (referred to above as L) may be adjusted in order to provide a desired balance between accuracy and computational cost (e.g., computational load, energy cost, time requirements, memory requirements, or other computational costs) of the localization process.

In some embodiments, the UE may further determine whether each entry of the key index contains a number of mapped multidimensional features of the first plurality of multidimensional features that is larger than a predetermined threshold. For example, it may be the case that an entry of the key index has a large number of features mapped to it, which may be caused by bias in the LSH algorithm. The UE may then ignore these entries of the key index for which it is determined that the number of mapped multidimensional features is larger than the predetermined threshold.

At 404, a query image may be received. In some embodiments, the query image may be a picture taken by the camera 310 of the UE, and the query image may illustrate the current surroundings of the UE. In some embodiments, the camera may transmit the query image to the digital circuitry 304.

At 406, a second plurality of multidimensional features may be extracted from the query image. The UE may extract the second plurality of multidimensional features using the same algorithm as was used for the training images. For example, the UE may extract SURF features from the query image.

At 408, a second hashing-based mapping may be performed from each of the second plurality of multidimensional features to entries in the key index. Similar to step 402, the second hashing-based mapping may be performed according to an LSH algorithm, and it may be performed a plurality of times for a plurality of independent key indices.

At 410, a first training image of the plurality of training images may be identified. In some embodiments, the first training image may identified based on a correspondence between the respective first hashing-based mapping of the first training image and the second hashing-based mapping. For example, for each entry of the key index that is mapped to one of the query images multidimensional features, the UE may determine which training images contain a multidimensional feature that is also mapped to the same entry. The UE may rank each of the training images based on how many of their respective multidimensional features are mapped to the same entry in the key index as one of the query images multidimensional features. In other words, the UE may count matches, by counting how many multidimensional features from each training image are mapped to the same entry in the key index as one of the multidimensional features of the query image. The UE may then identify the training image with the largest number of matches as the first training image.

For embodiments wherein either or both of the first and second hashing-based mappings are performed for a plurality of independent key indices, determining the number of multidimensional features of the first plurality of multidimensional features of each respective training image that are mapped to the same entries in the key index as any of the second plurality of multidimensional features, may be cumulatively performed for each of the plurality of independent key indices.

At 412, a location of the UE may be determined based on a location tag associated with the first training image. For example, each training image may be geo-tagged with an associated location. The UE may determine that the UE is located in the location associated with the first training image through its location tag. Importantly, the UE may be able to determine its location without communicating with any remote device (e.g., a satellite, base station, Wi-Fi access point, or other remote entity), hence preserving the privacy of the UE.

In some embodiments, the preceding method steps may be performed by digital circuitry of a UE. The digital circuitry may include one or more programmable hardware elements. In other embodiments, the digital circuitry may include one or more processors that execute program instructions stored in the memory medium. In other embodiments, the digital circuitry may include one or more dedicated digital devices such as application specific integrated circuits (ASICs).

Evaluations of CaPSuLe

In this section, experimental results are described from using CaPSuLe on the set of 719 training images and 152 query images described above, according to one embodiment. CaPSuLe performance is evaluated on four metrics: 1) Response Time, 2) Energy Consumption, 3) Accuracy and 4) Main Memory. Response time and energy consumption are measured for the complete end-to-end process, i.e., including the feature extraction, retrieval, and final ranking. Accuracy is measured over the test set as the percentage of time the algorithm identifies the correct location. Main memory usage is the amount of DRAM used. System performance is improved when all four metrics are properly balanced.

Cost-Quality Tradeoff through K and L: There are two main parameters in the CaPSuLe system, K, and L. To reiterate, K determines the range of the hash table (K-bits), which is also its size. L specifies the number of hash tables. K and L are the knobs which enable finer control over the cost-quality tradeoff. If we increase K and L, the recall is better, but the space required grows significantly.

Figure 5:
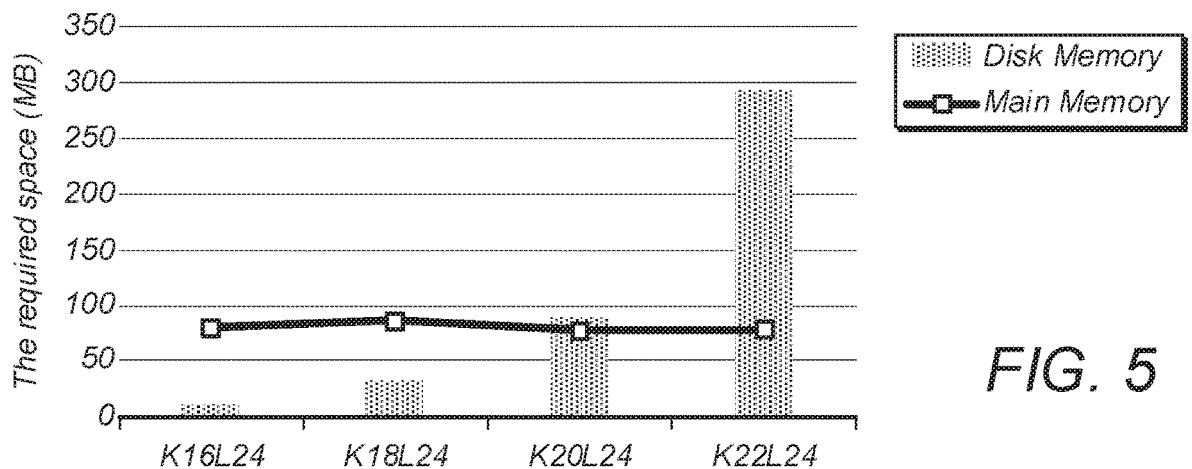
FIG. 5 is a chart illustrating experimental data of memory requirements for various values of K and L, according to various embodiments.

FIG. 5—Required Memory for Varying K

FIG. 5 is a plot of the required memory utilization with varying K. In the illustrated embodiment, the buckets are loaded into main memory on demand. If K is set to equal 24, the amount of main memory needed by a single hash table easily grows to around 1 GB which for L>1 hash tables is infeasible. If a lower value of K is used, then the accuracy drops by around 10%. We found that other than memory, the computational, energy, and response time costs are not sensitive to variations in K and L. In other words, memory-accuracy is the main tradeoff. It was found that in one embodiment, K=22 and L=24 is an advantageous combination that balances both accuracy and memory. The example illustrated here uses these values for K and L. Note, each of the two parameters may be tuned offline.

Competing Solutions: In this section, we approximate the accuracy of the brute force algorithm described above. However, we want our solution to run with limited energy, memory, and latency range, which are important for a device positioning system. The primary baseline used for comparison is the bruteforce algorithm in the state-of-the-art package OpenCV. In addition to bruteforce and CaPSuLe, two classical and cheaper baseline approaches are also performed:

BoW based image matching: As described above, popular BoW based features are used which exploit clustering over SURF features to make matching efficient. However, there is a significant drop in the accuracy in this case. With 1000 Bag-of-words (or cluster centers), an accuracy of 75% was achieved even after fine tuning. Increasing BoW to 5000 led to no significant gains.

Supervised Learning: Another method treats location identification as a multi-class classification problem. Each location is treated as a class label and training images are used that are labeled with the location as the standard supervised multi-class classification. However, supervised learning fails to achieve more than 80% of accuracy. We used VLFeat, an open source package for image classification in this experiment. VLFeat is described in further detail in reference (8) above, which is incorporated by reference.

Performance Summary

In one embodiment, K=22 and L=24 was selected for the CaPSuLe settings. The response time and energy consumption for bruteforce and CaPSuLe are evaluated below.

Figure 6:
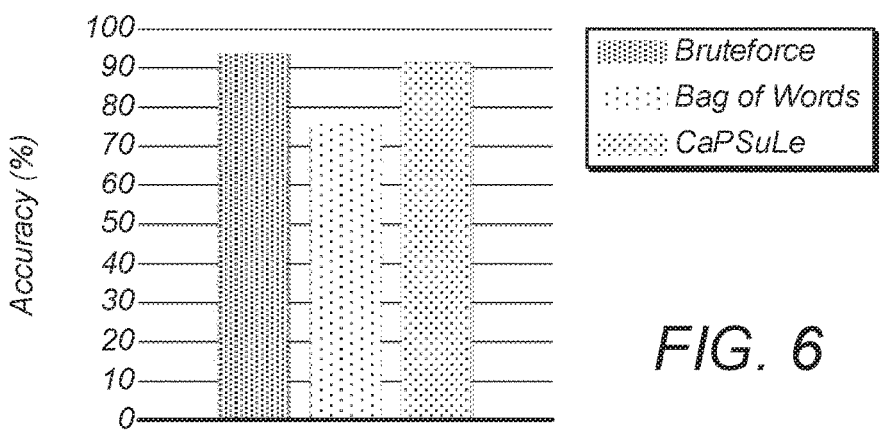
FIG. 6 is a bar chart comparing experimental data of localization accuracy for each of the Bruteforce method, Bag of Words (BoW) method, and CaPSuLE, according to one embodiment.

Accuracy: For the dataset used, the accuracy of bruteforce is 93%, BoW 75%, supervised learning 77% and CaPSuLe 92.11%, as shown in FIG. 6. Bruteforce method yielded the highest accuracy among three methods, while CaPSuLe is very close (different by only 0.89%). This phenomenon is not surprising as our approach is an approximation of the Bruteforce method. BoW and supervised learning methods have poor performance, and therefore, their time and energy consumption was not evaluated.

Response Time: The response time of Bruteforce and CaPSuLe was estimated. The response time using the Bruteforce method is 537 times more than CaPSuLe on the target mobile device. CaPSuLe took only 1.92 seconds in the positioning phase on the device. However, the response time using the Bruteforce method was 1030.43 seconds in the online phase, which is unacceptably long for most practical applications.

Energy Consumption: The Bruteforce method used 2103.22 J on our mobile system in the online phase. This amount of energy consumption further makes current algorithms not practical for mobile applications. However, CaPSuLe consumed mere 3.78 J for localization, which is 557× smaller than Bruteforce method.

Figure 7:
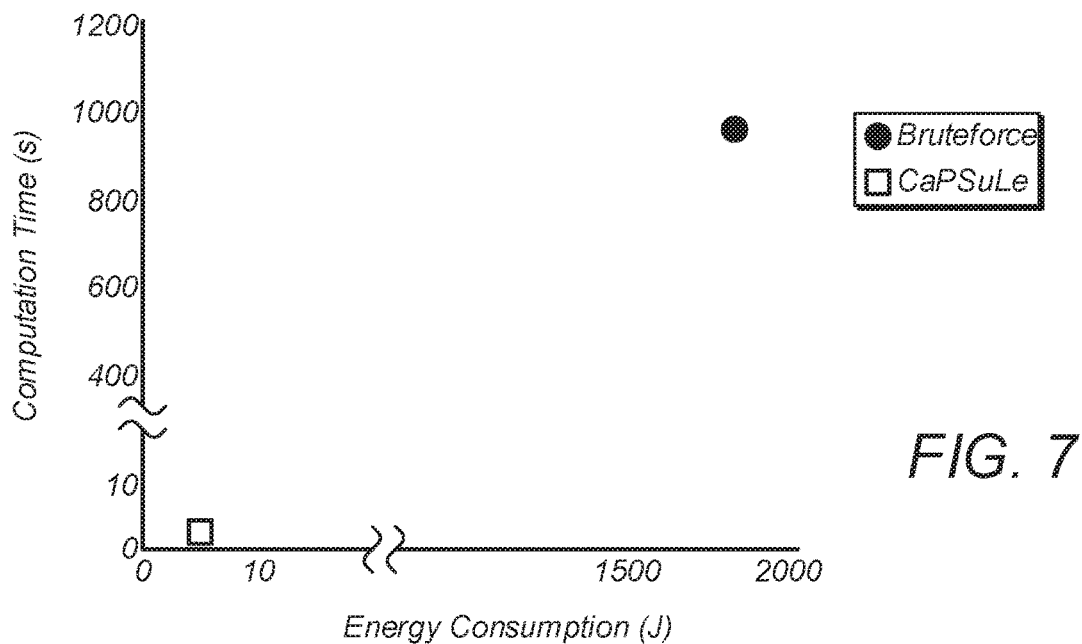
FIG. 7 is a scatter plot comparing experimental data of computation time vs. energy consumption for each of the Bruteforce method and CaPSuLe, according to one embodiment.

FIG. 7—Energy Consumption vs. Response Time

FIG. 7 illustrates the energy-time comparisons for the Bruteforce and CaPSuLe algorithms. The overall comparison between CaPSuLe and the state-of-the-art Bruteforce matching algorithm on our platform and dataset are summarized in Table II. By sacrificing only 0.89% of the accuracy, CaPSuLe is 537 times faster in the response time and 557 times cheaper in energy consumption.

TABLE II

Evaluations for CaPSuLe and Bruteforce

| | K22L24 | Bruteforce |
|---|---|---|
| Accuracy | 92.11% | 93.42% |
| Energy Consumption | 3.78 J | 2103.22 J |
| Response Time | 1.92 sec | 1030.43 sec |
| Required Storage Space | 294.39 MB | 363 MB |
| Required Memory Space | 78.90 MB | 171.41 MB |

CONCLUSION

It is widely assumed that cloud-based Machine Learning Solutions are the future. However, cloud-based applications are not ideal for the societal problem of sustainability and privacy. Embodiments described herein have shown that by trading a small (insignificant) amount of quality, modern machine learning solutions can be made private and sustainable, thus eliminating the need for the cloud. The cost-quality control provided by randomized hashing algorithms is used to demonstrate an end-to-end indoor camera-based positioning system CaPSuLe which can localize a mobile device, with 92.11% accuracy, in 1.92 seconds of local (on-device) computations consuming 3.78 Joules of energy, using a Samsung Galaxy S4 platform.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system or UE, cause the computer system or UE to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for machine-learning camera-based indoor mobile positioning, the method comprising:
by a user equipment device (UE):
for each of a plurality of respective training images, receiving a first hashing-based mapping from a first plurality of multidimensional features of each respective training image to entries in a key index;
determining whether each entry of the key index contains a number of mapped multidimensional features of the first plurality of multidimensional features that is larger than a predetermined threshold;
ignoring any entries of the key index for which it is determined that the number of mapped multidimensional features of the first plurality of multidimensional features is larger than the predetermined threshold;
receiving a query image;
extracting a second plurality of multidimensional features from the query image;
performing a second hashing-based mapping from each of the second plurality of multidimensional features to entries in the key index;
identifying a first training image of the plurality of training images, wherein the first training image is identified based on a correspondence between the respective first hashing-based mapping of the first training image and the second hashing-based mapping ignoring the ignored entries of the key index; and
determining a location of the UE based on a location tag associated with the first training image.

2. The method of claim 1, the method further comprising:
for each of the plurality of respective training images:
extracting the first plurality of multidimensional features from the respective training image; and performing the first hashing-based mapping from the first plurality of multidimensional features of each respective training image to entries in the key index.

3. The method of claim 1, the method further comprising:
for each of the plurality of respective training images, receiving additional first hashing-based mappings from the first plurality of multidimensional features of each respective training image to entries in additional independent key indices, wherein a quantity of additional first hashing-based mappings is based at least in part on obtaining a balance between accuracy and computational cost of the positioning;
wherein said performing the second hashing-based mapping from each of the second plurality of multidimensional features to entries in the key index is performed a plurality of times for each of the additional independent key indices; and
wherein said identifying a first training image is further based on a correspondence between the additional first hashing-based mappings of the first training image and the second hashing-based mappings.

4. The method of claim 1, wherein the hashing-based mapping comprises Locality Sensitive Hashing (LSH).

5. The method of claim 4, wherein the LSH employs sparsity to reduce the computational hashing cost per training image and per query image.

6. The method of claim 1, wherein the location of the UE is determined without communicating with any other device external to the UE.

7. The method of claim 1,
wherein the predetermined threshold is determined based at least in part on a total number of multidimensional features of the plurality of training images.

8. A user equipment device (UE), comprising:
a camera;
a memory medium; and
digital circuitry coupled to the camera and the memory medium;
wherein the camera is configured to acquire a query image;
wherein the digital circuitry is configured to:
for each of a plurality of respective training images, receive a first hashing-based mapping from a first plurality of multidimensional features of each respective training image to entries of a key index;
determine whether each entry of the key index contains a number of mapped multidimensional features of the first plurality of multidimensional features that is larger than a predetermined threshold;
ignore any entries of the key index for which it is determined that the number of mapped multidimensional features of the first plurality of multidimensional features is larger than the predetermined threshold;
store the first hashing-based mappings in the memory medium;
receive the query image from the camera;
extract a second plurality of multidimensional features from the query image;
perform a hashing-based mapping from each of the second plurality of multidimensional features to entries of the key index;
for each of the respective training images, determine a number of multidimensional features of the first plurality of multidimensional features of the respective training image that are mapped to the same entries of the key index as any of the second plurality of multidimensional features ignoring the ignored entries of the key index;
identify a first training image of the plurality of training images that has a largest number of multidimensional features that are mapped to the same entries of the key index as any of the second plurality of multidimensional features;
determine a location of the UE based on a location tap associated with the first training image.

9. The UE of claim 8, wherein the digital circuitry is further configured to:
for each of the plurality of training images:
extract the first plurality of multidimensional features from the respective training image; and
perform the first hashing-based mapping from the first plurality of multidimensional features to entries of the key index.

10. The UE of claim 8,
wherein said performing the first hashing-based mapping from the first plurality of multidimensional features to entries in the key index is performed a plurality of times for a plurality of independent key indices;
wherein said performing the second hashing-based mapping from each of the second plurality of multidimensional features to entries in the key index is performed a plurality of times for the plurality of independent key indices; and
wherein said determining the number of multidimensional features of the first plurality of multidimensional features of the respective training image that are mapped to the same entries in the key index as any of the second plurality of multidimensional features is cumulatively performed for each of the plurality of independent key indices.

11. The UE of claim 8,
wherein the plurality of training images comprises n training images; and
wherein storing the hashing-based mappings in the memory medium comprises storing an n-bit array indexed by the entries of the key index, wherein for each entry of the key index, each of the n bits is set to 0 or 1 depending on whether a feature of the nth training image was hashed to the entry.

12. The UE of claim 8, wherein the digital circuitry includes one or more programmable hardware elements.

13. The UE of claim 8, wherein the digital circuitry includes one or more processors that execute program instructions stored in the memory medium.

14. The UE of claim 8, wherein the digital circuitry includes one or more dedicated digital devices such as application specific integrated circuits (ASICs).

15. The UE of claim 8, wherein the first hashing-based mappings are loaded into the digital circuitry during runtime.

16. A non-transitory computer-readable memory medium configured to store program instructions which, when executed, are configured to cause a user equipment device (UE) to:
for each of a plurality of respective training images, receive a first hashing-based mapping from a first plurality of multidimensional features of each respective training image to entries in a key index;
determine whether each entry of the key index contains a number of mapped multidimensional features of the first plurality of multidimensional features that is larger than a predetermined threshold;

ignore any entries of the key index for which it is determined that the number of mapped multidimensional features of the first plurality of multidimensional features is larger than the predetermined threshold;
store the first hashing-based mapping in the memory medium;
receive a query image;
extract a second plurality of multidimensional features from the query image;
perform a second hashing-based mapping from each of the second plurality of multidimensional features to entries in the key index;
identify a first training image of the plurality of training images, wherein the first training image is identified based on a correspondence between the respective first hashing-based mapping of the first training image and the second hashing-based mapping ignoring the ignored entries of the key index; and
determine a location of the LITE based on a location tag associated with the first training image.

17. The non-transitory computer-readable memory medium of claim 16, wherein the program instructions are further executable to cause the UE to:
for each of the plurality of respective training images:
extract the first plurality of multidimensional features from the respective training image; and
perform the first hashing-based mapping from the first plurality of multidimensional features of each respective training image to entries in the key index.

18. The non-transitory computer-readable memory medium of claim 16, wherein the program instructions are further executable to cause the UE to:
for each of the plurality of respective training images, receive additional first hashing-based mappings from the first plurality of multidimensional features of each respective training image to entries in additional independent key indices;
wherein said performing the second hashing-based mapping from each of the second plurality of multidimensional features to entries in the key index is performed a plurality of times for each of the additional independent key indices; and
wherein said identifying a first training image is further based on a correspondence between the additional first hashing-based mappings of the first training image and the second hashing-based mappings.

19. The non-transitory computer-readable memory medium of claim 16,
wherein the plurality of training images comprises n training images; and
wherein storing the hashing-based mappings in the memory medium comprises storing an n-bit array indexed by the entries of the key index, wherein for each entry of the key index, each of then bits is set to 0 or 1 depending on whether a feature of the nth training image was hashed to the entry.

20. The non-transitory computer-readable memory medium of claim 16,
wherein the key index comprises $2^K$ entries, wherein each entry is K bits in length, and wherein K is selected based at least in part on obtaining a balance between accuracy and computational cost of the positioning.

* * * * *

UNITED STATES PATENT AND TRADEMARK OFFICE
CERTIFICATE OF CORRECTION

PATENT NO. : 10,996,060 B2
APPLICATION NO. : 16/327900
DATED : May 4, 2021
INVENTOR(S) : Anshumali Shrivastava et al.

It is certified that error appears in the above-identified patent and that said Letters Patent is hereby corrected as shown below:

In the Claims

Claim 8, Column 18, Line 9, please delete "tap" and insert -- tag --.

Claim 16, Column 19, Line 19, please delete "LITE" and insert -- UE --.

Claim 19, Column 20, Line 22, please delete "then" and insert -- the $n$ --.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*